United States Patent Office 3,371,080
Patented Feb. 27, 1968

3,371,080
PHENYLALANINE²-ORNITHINE⁸-VASOPRESSIN
Roger Boissonnas, Bottmingen, and René Huguenin, Reinach, Basel-Land, Switzerland, assignors to Sandoz Ltd. (also known as Sandoz A.G.), Basel, Switzerland
No Drawing. Filed June 1, 1964, Ser. No. 371,762
Claims priority, application Switzerland, June 6, 1963, 7,123/63
The portion of the term of the patent subsequent to Jan. 17, 1984, has been disclaimed
4 Claims. (Cl. 260—112.5)

The present invention relates to a new polypeptide and to a process for the production thereof.

The present invention provides the polypeptide of Formula I

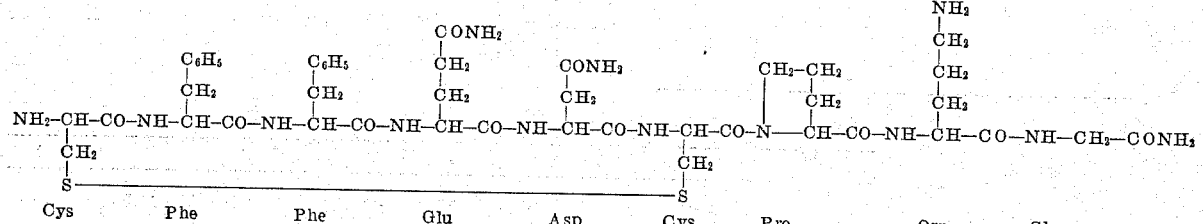

and its acid addition salts.

The present invention also provides a process for the production of a polypeptide of Formula I and its acid addition salts, which comprises oxidizing the nonapeptide of Formula V,

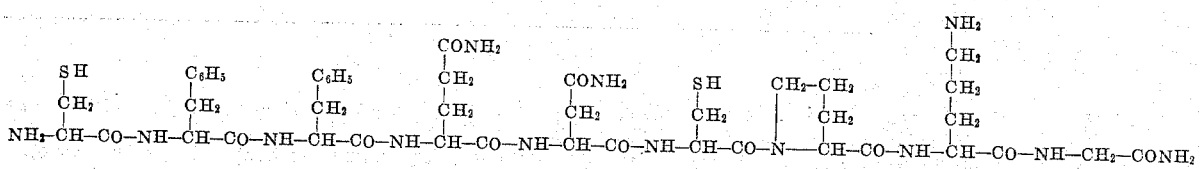

in aqueous solution at a pH value from about 4 to about 9 and, when it is desired to produce an acid addition salt, reacting the resulting Compound I with an organic or inorganic acid.

The polypeptide V may be obtained by methods for the synthesis of compounds of this type in actual use or described in the literature on the subject, it being possible to join together the amino acids in the order indicated in the above Formula V one at a time or by first forming constituent peptide units and joining these together.

One method of producing Compound I and its acid addition salts comprises condensing a hexapeptide derivative of Formula II,

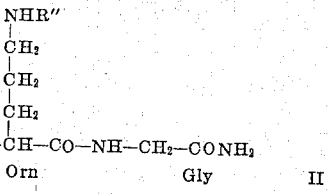

in which R′ denotes a radical capable of protecting a sulfhydryl radical in peptide synthesis and R″ denotes a radical capable of protecting an amino radical in peptide synthesis, with a reactive derivative of a free acid, said free acid having Formula III

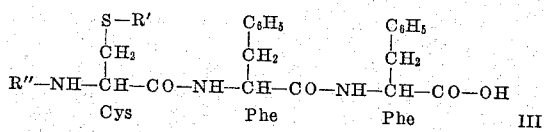

in which R′ and R″ have the above significance, to give the nonapeptide derivative of Formula IV,

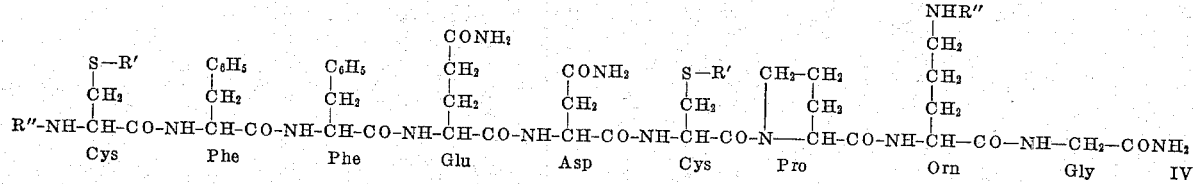

in which R′ and R″ have the above significance, converting this to the nonapeptide of Formula V, by split-

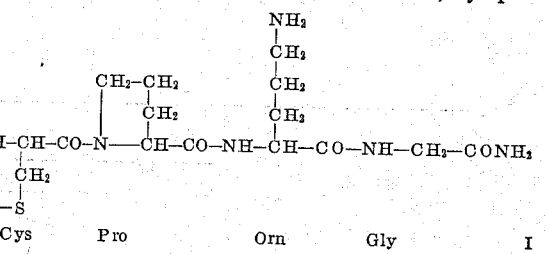

ting off the protective radicals R′ and R″, and converting this to the Compound I by oxidation as above.

Compounds II and the corresponding free hexapeptide also form part of the present invention.

It will be appreciated that it is within the scope of the present invention to produce Compound I starting with Compound IV above, irrespective of the method used for producing Compound IV.

The nonapeptide derivative IV may be obtained, for example, by condensation of two polypeptides other than the ones indicated above (or an octapeptide and an amino acid) in the form of their protected derivatives.

Examples of radicals for protecting the sulfhydryl radical in the above compounds are the phenyl, benzyl, p-bromobenzyl, p-chlorobenzyl, p-nitrobenzyl or p-xylyl radicals, while examples of radicals for protecting the amino radical are the carbobenzoxy, p-chlorobenzyloxycarbonyl, p-toluenesulfonyl or triphenylmethyl radicals.

The starting materials for producing the nonapeptide derivative V by methods other than the one described herein may be obtained by methods for the synthesis of peptides in actual use or described in the literature on the subject, it being possible to join together the amino acids one at a time or by first forming constituent peptide units and joining these together.

As indicated above, oxidation of the nonapeptide V to give the Compound I is effected in accordance with the invention by oxidizing in aqueous solution at a pH value of from about 4 to about 9. The oxidation is preferably effected by the introduction of air, oxygen or hydrogen peroxide; an oxidizing agent, e.g., potassium ferricyanide, can likewise be used.

The polypeptide I may be converted into its acid addition salts by reaction with an organic or inorganic acid. Examples of acids suitable for acid salt formation with Compound I are as follows: hydrochloric, hydrobromic, sulfuric, fumaric, malic, maleic, acetic and tartaric acids.

Structurally, Compound I resembles the two natural vasopressins though in each case two of the nine constituent amino acid residues are different as may be seen from the following:

It is suggested that, when Compound I is used in an operation under local anaesthesia, it should be administered in admixture with the local anaesthetic, while when it is used in an operation under general narcosis, it should be administered in the form of a dilute physiological sodium chloride solution. Compound I is further suggested for use orally in the therapeutical treatment of certain cases of hypotonia or in the treatment of shocks and collapses.

Compound I may be used as free base or as the addition salt with an organic or inorganic acid, either on its own or in the form of appropriate medicinal preparations for administration, e.g., orally, parenterally, enterally or intranasally. In order to produce such medicinal preparations, the Compound I and/or its acid addition salt is worked up with organic or inorganic adjuvants which are inert and physiologically acceptable. Examples of such adjuvants are as follows:

Tablets and dragées: lactose, starch, talc and stearic acid.

Syrups: solutions of cane sugar, invert sugar and glucose.

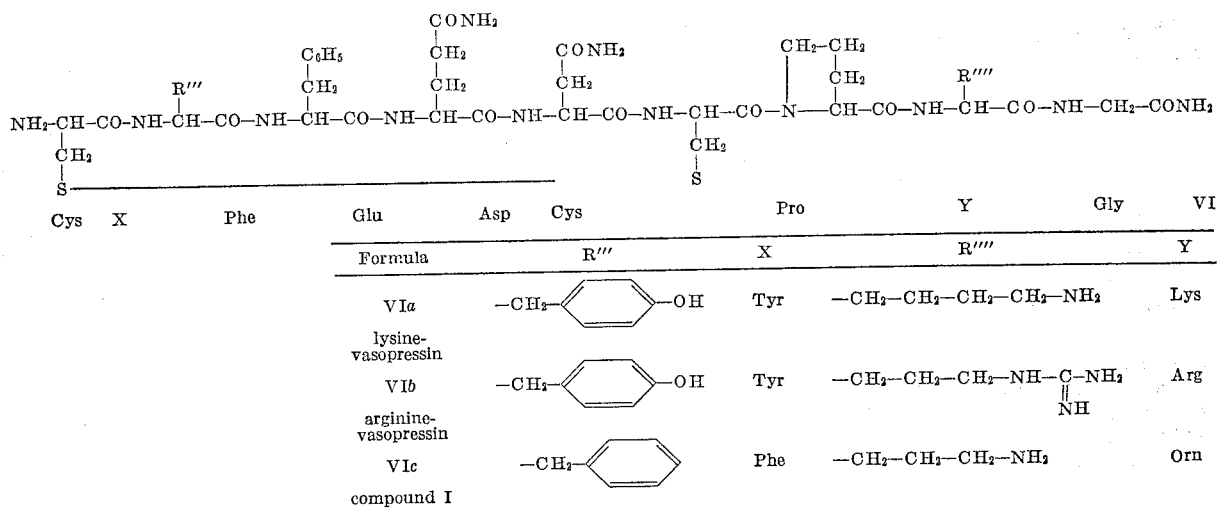

It will be seen that Compound I, i.e., Formula VI–c, (i) contains a phenylalanyl radical in the place of the tyrosyl radical present in both vasopressin from pigs (Formula VI–a) and vasopressin from cattle (Formula VI–b) and (ii) contains an ornithine radical in the place of the lysine radical present in pig vasopressin or of the arginine radical present in cattle vasopressin respectively.

Compound I has a vasoconstrictive action equal to that of the natural vasopressins; however, in contradistinction to the natural vasopressins, the antidiuretic action of Compound I is, to a large extent, absent, and it is thus suggested for use in therapy as a substance having a specific vasoconstrictive effect. This specific vasoconstrictive effect of Compound I results from a direct influence on the vascular muscles; for this reason no appreciable side effects on the vegetative nervous system are produced, as is the case with adrenalin and noradrenalin. The properties of Compound I are especially useful in the prophylaxis and therapy of parenchymatous bleeding, whereby infiltration of the tissues with Compound I produces a pronounced ischaemic effect. The properties of Compound I are, furthermore, of special use in surgery of the throat, nose and ear, in gynaecology and obstetrics, in urology and dentistry.

Injectable solutions: water, alcohols, glycerin and vegetable oils.

Suppositories: natural or hardened oils and waxes.

The preparations may furthermore contain suitable preserving, stabilizing or wetting agents, solubilizers, sweetening and coloring substances or flavorings.

The Compound I may be administered in approximately the following dosages:

(a) In admixture with a local anaesthetic: 5 to 30 I.U./100 ml. solution.

(b) Infiltration of the operation area in the case of a general anaesthetic: 10 to 80 I.U./100 ml. of physiological saline solution.

(c) Instillation or application by means of pledget: 10 to 70 I.U./100 ml. of physiological saline solution.

(d) Systemic application in the case of circulatory collapse: 5 to 50 I.U./500 ml. of physiological saline solution or 5% glucose solution administered by slow infusion.

Suitable ampules are, for example, those of 1 ml. containing 5 I.U. or those of 10 ml. containing 15 I.U.

The present invention thus also provides pharmaceutical compositions containing, in addition to a physiologically acceptable carrier, Compound I and/or an acid addition salt thereof.

EXAMPLE 1

(a) *N-α-carbobenzoxy-N-δ-p-toluenesulfonyl-L-ornithyl-glycine ethyl ester*

104 g. of N-α-carbobenzoxy-N-δ-p-toluenesulfonyl-L-ornithine and 27 g. of glycine ethyl ester are dissolved in 450 cc. of acetonitrile, the mixture is cooled at 0°, 51 g. of dicyclohexylcarbodiimide are added and the mixture is shaken at room temperature for 4 hours. Precipitated dicyclohexyl urea is filtered off and washed with acetonitrile. The whole filtrate is evaporated in a vacuum. The residue crystallizes after the addition of petroleum ether. After recrystallization from n-propanol, 93 g. of N - α - carbobenzoxy - N - δ - p - toluenesulfonyl - L-ornithyl-glycine ethyl ester are obtained; melting point 135°; $[α]_D^{22}=-7°$ (96% ethanol).

(b) *N-carbobenzoxy-L-prolyl-N-δ-p-toluenesulfonyl-L-ornithyl-glycinamide*

90 g. of N-α-carbobenzoxy-N-δ-p-toluenesulfonyl-L-ornithyl-glycine ethyl ester are dissolved in 800 cc. of anhydrous acetic acid which has been saturated with hydrogen bromide. The mixture is left to stand for one hour at 20°, evaporated in a vacuum at a temperature below 40° and the residue washed carefully with diethyl ether. The residue is dissolved in 500 cc. of acetonitrile, 25 cc. of triethylamine and 43 g. of N-carbobenzoxy-L-proline are added, cooling is effected at 0°, 35.5 g. of dicyclohexylcarbodiimide are then added and the mixture shaken overnight at 20°. After filtering off dicyclohexyl urea, the filtrate is evaporated in a vacuum at 30°, the residue dissolved in ethyl acetate and this solution is washed with dilute sulfuric acid and aqueous ammonia. After drying over sodium sulfate, the ethyl acetate is removed by evaporation in a vacuum and the residue dissolved in 1 litre of absolute ethanol. The solution is cooled at 0°, saturated with ammonia and left to stand overnight at 20° C. After evaporating in a vacuum at 30°, the residue is recrystallized from acetonitrile. 58 g. of N - carbobenzoxy - L - prolyl - N - δ - p - toluenesulfonyl-L-ornithyl-glycinamide are obtained melting point 122° (with decomposition); $[α]_D^{22}=-46°$ (95% glacial acetic acid).

(c) *N - carbobenzoxy - L - glutaminyl - L - asparaginyl-S - benzyl - L - cysteinyl - L - prolyl - N - δ - p - toluenesulfonyl-L-ornithyl-glycinamide*

100 g. of N-carbobenzoxy-L-prolyl-N-δ-p-toluenesulfonyl-L-ornithyl-glycinamide are dissolved in 500 cc. of anhydrous acetic acid which has been saturated with hydrogen bromide, the solution is left to stand for one hour at 20° and is evaporated in a vacuum at a temperature below 40° The residue is carefully washed with diethyl ether and then added to a solution of 100 g. of N - carbobenzoxy - L - glutaminyl - L - asparaginyl - S-benzyl-L-cysteinyl-azide and 26 cc. of triethylamine in 1000 cc. of dimethylformamide. The mixture is left to stand overnight at 20°, 3000 cc. of ethyl acetate are added thereto, the precipitate is filtered off and washing is effected with ethyl acetate. 105 g. of N-carbobenzoxy-L-glutaminyl - L - asparaginyl - S - benzyl - L - cysteinyl - L-prolyl - N - δ - p - toluenesulfonyl - L - ornithyl - glycinamide are obtained; melting point 193°; $[α]_D^{20}=-39°$ (dimethylformamide).

(d) *N - carbobenzoxy - S-benzyl-L-cysteinyl-L-phenylalanyl - L - phenylalanyl - L-glutaminyl-L-asparaginyl-S-benzyl - L - cysteinyl-L-prolyl-N-δ-p-toluene-sulfonyl-L-ornithyl-glycinamide*

50 g. of N - carbobenzoxy-L-glutaminyl-L-asparaginyl-S - benzyl - L-cysteinyl-L-prolyl-N-δ-toluenesulfonyl-L-ornithyl-glycinamide are dissolved in 250 cc. of anhydrous acetic acid which has been saturated with hydrogen bromide and the solution is left to stand for one hour at 20°. After evaporating the solvent in a vacuum at a temperature below 40°, the residue is carefully washed with diethyl ether and a solution of 31.5 g. of N-carbobenzoxy-S - benzyl - L-cysteinyl-L-phenylalanyl-L-phenylalanine-azide and 7.5 cc. of triethylamine in 250 cc. of dimethylformamide is added thereto. The mixture is left to stand for 2 days at 20°, 1000 cc. of ethyl acetate are subsequently added and the precipitate is washed with ethyl acetate. After drying in a vacuum at 30°, the product is washed with warm methanol. 45 g. of N-carbobenzoxy-S - benzyl - L - cysteinyl-L-phenylalanyl-L-phenylalanyl-L - glutaminyl - L - asparaginyl-S-benzyl-L-cysteinyl-L-prolyl - N - δ - p-toluenesulfonyl-L-ornithyl-glycinamide are obtained; melting point 224°; $[α]_D^{21}=-40°$ (dimethylformamide).

(e) *L - cysteinyl - L - phenylalanyl - L-phenylalanyl-L-glutaminyl - L - asparaginyl - L-cysteinyl-L-prolyl-L-ornithyl-glycinamide*

The necessary amount of sodium or potassium metal is added to a solution of 5 g. of N-carbobenzoxy-S-benzyl-L - cysteinyl - L - phenylalanyl - L-phenylalanyl-L-glutaminyl - L - asparaginyl - S - benzyl-L-cysteinyl-L-prolyl-N - δ - p - toluenesulfonyl-L-ornithyl-glycinamide in 1200 cc. of dry liquid ammonia, while stirring at the boiling temperature of the solution, to give a stable blue coloration. After the addition of 3 g. of ammonium chloride, the solution is evaporated to dryness. The residue contains L - cysteinyl - L - phenylalanyl-L-phenylalanyl-L - glutaminyl - L - asparaginyl-L-cysteinyl-L-prolyl-L-ornithyl-glycinamide.

(f) *Polypeptide Compound I*

The residue obtained from step (e) above is dissolved in 5 litres of 0.01 N acetic acid and oxidized at a pH value of 6.5–8.0 by introducing air or oxygen for one hour at 20°. The solution is brought to a pH value of 4.0–5.0 with dilute hydrochloric acid and after the addition of 50 g. of sodium chloride or 0.64 g. of methanesulfonic acid or 0.76 g. of trifluoroacetic acid, evaporation to dryness is effected, whereby a dry powder results which keeps well. It may be stored and when used it may be dissolved to give a clear solution. However, the solution may also be used as such, if desired after diluting with water or a salt solution.

For purposes of removing the inorganic salts, the above powder, obtained after the addition of trifluoroacetic acid, may be subjected to counter-current distribution in the system secondary butanol/water/trifluoroacetic acid 120:160:1. After 200 transfer stages the substance is present in tubes 57 to 77 with a maximum in tube 67 (K=0.50). After evaporation, the active polypeptide is obtained with a good yield in the form of a hydroscopic trifluoroacetate, with uniform behavior in chromatography and electrophoresis. Migration in paper electrophoresis at a pH value of 5.8 and 40 V/cm.; 50 mm. in 60 minutes (the histidine used as reference migrates 65 mm.). Migration in paper electrophoresis at a pH value of 1.9 and 40 V/cm.: 69 mm. in 60 minutes (the tryptophane used as reference migrates 66 mm.). Rf in paper chromatography in the system isoamyl alcohol/pyridine/water 35:35:30: 0.28. Total hydrolysis (16 hours, 110°, HCl 6 N) yields the following amino acids in equimolecular quantities: cystine, glutaminic acid, asparaginic acid, proline, ornithine and glycine; and in double equimolecular quantity: phenylalanine. The compound has the following biological activities: 150 IU/mg. on the blood pressure of the rat, 15 IU/mg. on the inhibition of diuresis of the rat and less than 1 IU/mg. on the uterus of the rat.

EXAMPLE 2

The same procedure as in Example 1 is used, except that final oxidation is effected at 0–40° by the addition of 7.5 cc. of a N solution of hydrogen peroxide in water at a pH value of 7.5–8.0 (instead of oxidation by introducing air on oxygen).

EXAMPLE 3

The same procedure as in Example 1 is used, except that final oxidation is effected at 0–35° by the addition of 6.7 cc. of a N solution of potassium ferricyanide in water at a pH value of 5.5–7.5.

What is claimed is:

1. A compound selected from the group consisting of a polypeptide of formula:

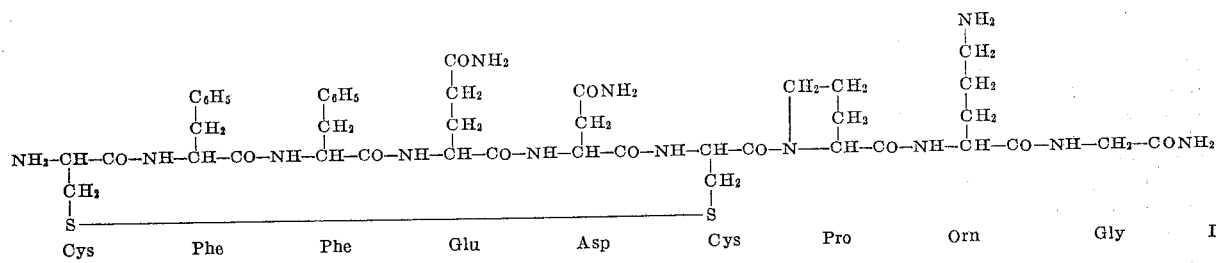

and is pharmaceutically acceptable, non-toxic, acid addition salts wherein all amino acid groupings except glycine are of L-configuration.

2. A compound selected from the group consisting of a nonapeptide of formula:

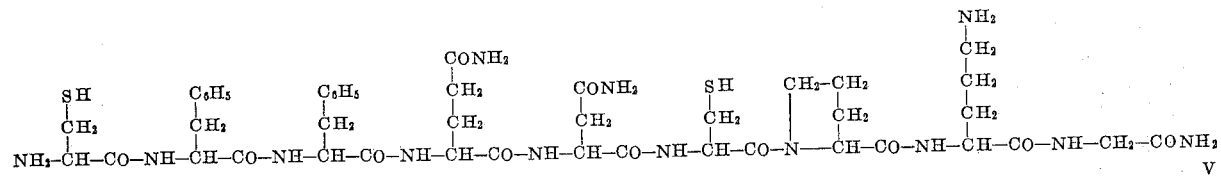

and its pharmaceutically acceptable, non-toxic, acid addition salts wherein all amino acid groupings except glycine are of L-configuration.

3. A compound of the formula

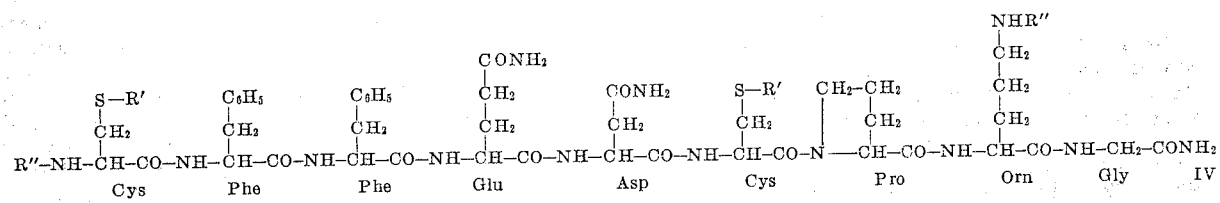

wherein R' is a peptide synthesis sulfhydryl radical protector selected from the group consisting of phenyl, benzyl, p-bromobenzyl, p-chlorobenzyl, p-nitrobenzyl and p-xylyl, and R'' is a peptide synthesis amino radical protector, wherein all amino acid groupings except glycine are of L-configuration.

4. The compound N-carbobenzoxy-S-benzyl-L-cysteinyl - L - phenylalanyl - L - phenylalanyl - L - glutaminyl-L - asparaginyl - S - benzyl - L - cysteinyl - L - prolyl - N-δ - p - toluenesulfonyl - L - ornithyl - glycinamide.

References Cited

UNITED STATES PATENTS

| | | | |
|---|---|---|---|
| 3,216,991 | 11/1965 | Ondetti | 260—112.5 |
| 3,216,994 | 11/1965 | Bodanszky | 260—112.5 |
| 3,067,101 | 12/1962 | Easton | 167—65 |
| 3,089,818 | 5/1963 | Stone | 260—112.5 |
| 3,299,036 | 1/1967 | Boissonnas et al. | 260—112.5 |

OTHER REFERENCES

Boissonnas et al., Experientia 17, 377–390 (1961).

LEWIS GOTTS, *Primary Examiner.*

JULIAN S. LEVITT, ELBERT L. ROBERTS,
*Examiners.*

M. M. KASSENOFF, S. J. FRIEDMAN,
*Assistant Examiners.*